US012230904B2

(12) United States Patent
Zhang

(10) Patent No.: US 12,230,904 B2
(45) Date of Patent: Feb. 18, 2025

(54) ULTRA-SMALL SPACING PLUG, CONNECTOR, ELECTRONIC DEVICE AND MANUFACTURING METHOD OF PLUG

(71) Applicant: Shenzhen Yaqi Technology Co., Ltd., Shenzhen (CN)

(72) Inventor: Yongheng Zhang, Guangdong (CN)

(73) Assignee: Shenzhen Yaqi Technology Co., Ltd., Shenzhen (CN)

( * ) Notice: Subject to any disclaimer, the term of this patent is extended or adjusted under 35 U.S.C. 154(b) by 469 days.

(21) Appl. No.: 17/704,025

(22) Filed: Mar. 25, 2022

(65) Prior Publication Data

US 2022/0311165 A1 Sep. 29, 2022

Related U.S. Application Data

(63) Continuation of application No. PCT/CN2021/087558, filed on Apr. 15, 2021.

(30) Foreign Application Priority Data

Mar. 29, 2021 (CN) ........................ 202110334717.X

(51) Int. Cl.
*H01R 13/24* (2006.01)
*H01R 13/405* (2006.01)
*H01R 43/24* (2006.01)

(52) U.S. Cl.
CPC ........... *H01R 13/24* (2013.01); *H01R 13/405* (2013.01); *H01R 43/24* (2013.01)

(58) Field of Classification Search
CPC ...... H01R 13/24; H01R 13/405; H01R 43/24; H01R 12/73; H01R 12/716; H01R 13/422; H01R 12/70; H01R 13/02
See application file for complete search history.

(56) References Cited

U.S. PATENT DOCUMENTS 7,494,346 B1 2/2009 Peng
2018/0183168 A1* 6/2018 Sugaya ................ H01R 12/716
2021/0359443 A1* 11/2021 Mamuro ............ H01R 13/6471

FOREIGN PATENT DOCUMENTS

CN 203574136 U 4/2014
CN 208656070 U 3/2019
(Continued)

OTHER PUBLICATIONS

International Search Report of PCT Patent Application No. PCT/CN2021/087558 issued on Jan. 10, 2022.

*Primary Examiner* — Michael C Zarroli
(74) *Attorney, Agent, or Firm* — Andrew C. Cheng

(57) ABSTRACT

The present invention provides an ultra-small spacing plug and a connector. The ultra-small spacing plug includes a plug insulator, a plurality of first plug signal terminals and second plug signal terminals. The plug insulator is frame-shaped, and the plug insulator includes two convex ribs arranged oppositely. The first signal terminals are arranged on each side of the two convex ribs facing each other. The second signal terminals are arranged on each side of the two convex ribs far away from each other. Wherein the first signal terminals and the second signal terminals on each convex rib are arranged in a staggered mode; and one side of each convex rib far away from a socket is respectively provided with a clamping groove corresponding to each first signal terminal, and the first signal terminals are clamped in the clamping grooves.

7 Claims, 19 Drawing Sheets

(56) References Cited

FOREIGN PATENT DOCUMENTS

| | | | |
|---|---|---|---|
| CN | 209571614 | U | 11/2019 |
| CN | 111758188 | A | 10/2020 |
| CN | 211981070 | U | 11/2020 |
| JP | 2020129569 | A | 8/2020 |

* cited by examiner

S1: perform injection molding on second plug signal terminals and plug fixing members to obtain a plug insulator connected with the second plug signal terminals and the plug fixing members respectively S2: accommodate first plug signal terminals in clamping grooves of the plug insulator to obtain a plug

ULTRA-SMALL SPACING PLUG, CONNECTOR, ELECTRONIC DEVICE AND MANUFACTURING METHOD OF PLUG

TECHNICAL FIELD

The present invention belongs to the field of signal transmission technologies, and more particularly, is an ultra-small spacing plug, a connector, an electronic device and a manufacturing method of the plug.

BACKGROUND ART

A connector is often used in a circuit substrate to connect other circuits, so that the substrate is electrically connected with other circuits. Due to a small distance between convex portions on two sides of a plug in an existing connector, secondary pouring usually needs to be performed for molding, so that a production process is relatively tedious. Therefore, the plug in the existing connector has technical problems of tedious production process and low efficiency.

Technical Problem

In view of this, the technical problem to be solved by the present invention is to provide an ultra-small spacing plug capable of improving a production efficiency, a connector applying the above plug, an electronic device applying the above plug or the connector, and a manufacturing method of the above plug.

Technical Solution

The technical solution adopted in the present invention is that: in a first aspect, the present invention provides an ultra-small spacing plug, and the plug comprises: a plug insulator, wherein the plug insulator is frame-shaped, and the plug insulator comprises two convex ribs which are arranged oppositely; a plurality of first plug signal terminals, wherein the first plug signal terminals are arranged on each side of the two convex ribs facing each other; and a plurality of second plug signal terminals, wherein the second plug signal terminals are arranged on each side of the two convex ribs far away from each other; wherein, the first plug signal terminals and the second plug signal terminals on each convex rib are arranged in a staggered mode; and one side of each convex rib far away from a socket are respectively provided with a clamping groove corresponding to each first plug signal terminal, and the first plug signal terminals are clamped in the clamping grooves.

Further, a clamping arm is arranged in the clamping groove, and the clamping arm is located in a middle portion of the clamping groove; and the first plug signal terminal is provided with a bayonet corresponding to the clamping arm, and the first plug signal terminal is inserted into the clamping groove from the bayonet.

Further, each first plug signal terminal further comprises: an arm body, a contact elastic arm and a connecting arm; one end of the arm body is connected with the contact elastic arm through the connecting arm; and the bayonet is formed between one end of the arm body far away from the connecting arm and the contact elastic arm.

Further, the arm body is provided with a protrusion, one side of the clamping arm facing the arm body is provided with a clamping portion, and the first plug signal terminal is embedded into the clamping groove until the protrusion is clamped into the clamping portion.

Further, the contact elastic arm is elastic, and the contact elastic arm is arranged in an arc shape protruding towards the arm body.

Further, a deformation space is formed at a joint of the connecting arm and the contact elastic arm, and the deformation space is communicated with the bayonet.

Further, the first plug signal terminal is provided with a first plug weld leg, the second plug signal terminal is provided with a second plug weld leg, and the first plug weld legs and the second plug weld legs on each convex rib are arranged in a staggered mode.

In a second aspect, the present invention provides a manufacturing method of a plug, the plug is any ultra-small spacing plug above, and the manufacturing method of the plug comprises the following steps of: performing injection molding on the second plug signal terminals and plug fixing members to obtain the plug insulator connected with the second plug signal terminals and the plug fixing members respectively; and accommodating the first plug signal terminals in the clamping grooves of the plug insulator to obtain the plug.

In a third aspect, the present invention provides a connector, and the connector comprises the ultra-small spacing plug according to any one of the items above.

In a fourth aspect, the present invention provides an electronic device, and the electronic device comprises the ultra-small spacing plug according to any one of the items above.

Beneficial Effects

To sum up, the present invention has the following beneficial effects: according to the present invention, the first plug signal terminals are clamped into the clamping grooves on the plug insulator without needing secondary pouring, only the plug insulator needs to be molded by pouring according to a model, and then the first plug signal terminals are inserted into the clamping grooves, so that the present invention is simple in operation, accelerates a production speed, and improves a production efficiency. Moreover, the present invention is convenient to open a mold for the plug insulator, thus reducing a production cost. The present invention solves technical problems of tedious production process and low efficiency of the ultra-small spacing plug in the prior art.

Figure 1:
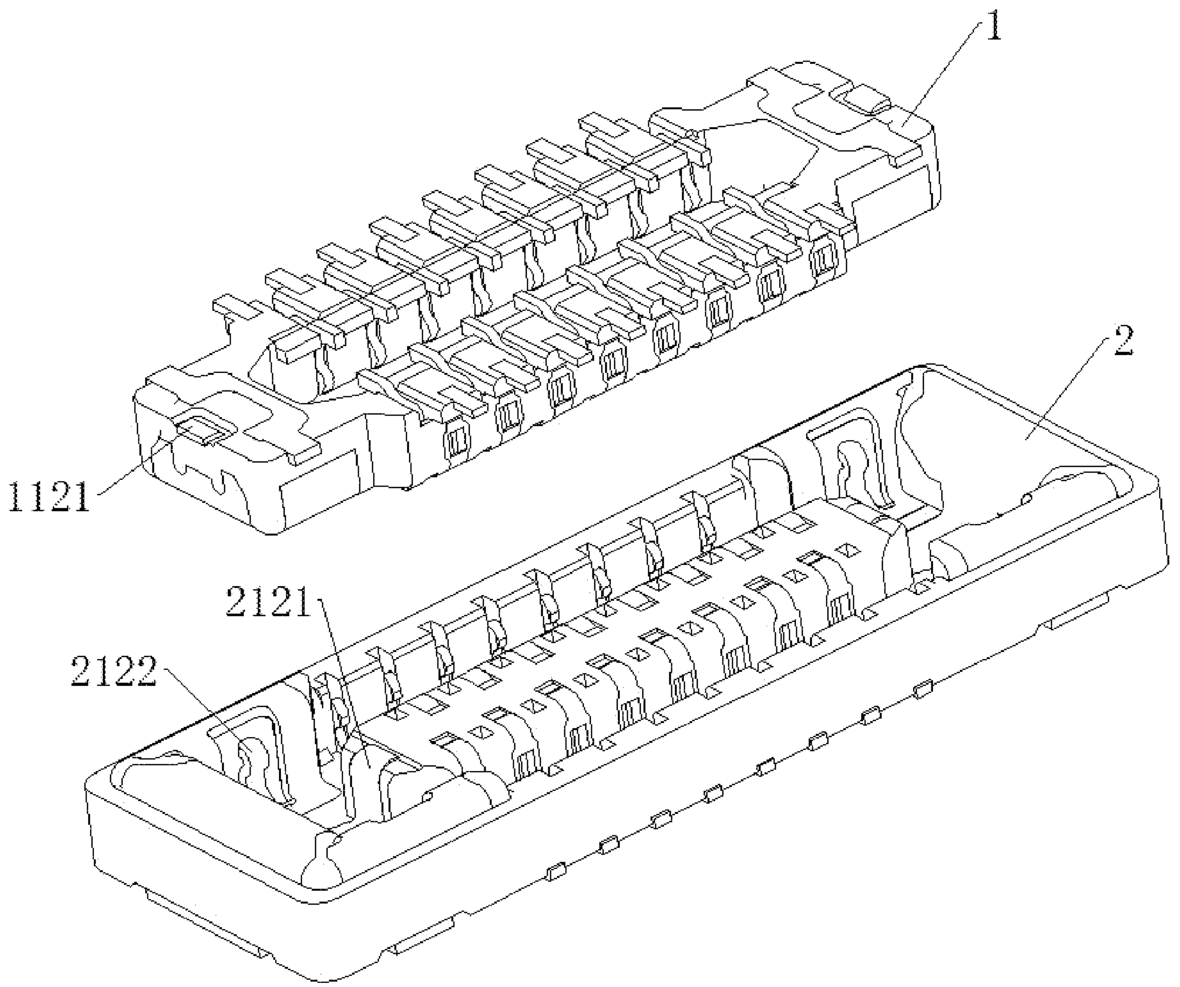
FIG. 1 is a schematic exploded diagram of a connector in specific Embodiment 1 of the present invention.

Descriptions of reference numerals in the drawings: 1 refers to plug; 11 refers to plug insulator; 111 refers to convex rib; 112 refers to plug fixing member; 1121 refers to fifth plug weld leg; 1122 refers to third plug weld leg; 1123 refers to fourth plug weld leg; 113 refers to clamping groove; 114 refers to clamping arm; 12 refers to first plug signal terminal; 121 refers to contact elastic arm; 122 refers to arm body; 123 refers to connecting arm; 124 refers to protrusion; 125 refers to contact portion; 126 refers to guiding portion; 127 refers to first plug weld leg; 13 refers to second plug signal terminal; 131 refers to second plug weld leg; 14 refers to first solder blocking portion; 141 refers to first portion; 142 refers to second portion; 15 refers to second solder blocking portion; 2 refers to socket; 21 refers to socket insulator; 211 refers to socket convex rib; 212 refers to socket fixing member; 2121 refers to fixing portion; 2122 refers to elastic member; 2123 refers to first socket weld leg; 213 refers to middle convex rib of socket; 22 refers to first socket signal terminal; and 23 refers to second socket signal terminal.

PREFERRED EMBODIMENTS OF INVENTION

The features and exemplary embodiments in various aspects of the present invention will be described in detail hereinafter, and in order to make the objects, the technical solutions and the advantages of the present invention clearer, the present invention is further described in detail hereinafter with reference to the embodiments. It should be understood that the specific embodiments described herein are only configured for explaining the present invention, and are not configured for limiting the present invention. For those skilled in the art, the present invention may be implemented without needing some of these specific details. The following descriptions of the embodiments are only intended to provide better understanding to the present invention by showing the examples of the present invention.

It should be noted that relational terms herein, such as first and second, are used only to distinguish one entity or operation from another entity or operation, and do not necessarily require or imply that there is any such actual relationship or order between these entities or operations. Furthermore, the terms "including", "comprising" or any variations thereof are intended to embrace a non-exclusive inclusion, so that a process, a method, an article, or a device comprising a series of elements, comprises not only those elements but also other elements not expressly listed, or further comprises elements inherent to such process, method, article, or device. In the absence of further limitation, an element defined by the phrase "comprising . . . " does not exclude the presence of the same element in the process, the method, the article, or the device.

The present invention is further described in detail hereinafter with reference to FIG. 1 to FIG. 10.

Embodiment 1 of the present invention provides an ultra-small spacing connector, which, with reference to FIG. 1, FIG. 2, FIG. 3 and FIG. 8, comprises a socket 2 and a plug 1. The plug 1 comprises: a plug insulator 11, wherein the plug insulator 11 is frame-shaped, and the plug insulator 11 comprises two convex ribs 111 which are arranged oppositely; a plurality of second plug signal terminals 13, wherein the second plug signal terminals 13 are arranged on each side of the two convex ribs 111 far away from each other; and a plurality of first plug signal terminals 12, wherein the first plug signal terminals 12 are arranged on each side of the two convex ribs 111 facing each other. One side of each convex rib 111 facing away from the socket 2 are respectively provided with a clamping groove 113 corresponding to each first plug signal terminal 12, and the first plug signal terminals 12 are accommodated in the clamping grooves 113. The first plug signal terminals 12 and the second plug signal terminals 13 on each convex rib 111 are arranged in a staggered mode. The convex ribs 111 are all provided with a first solder blocking portion 14, and the first solder blocking portions 14 are arranged far away from the convex ribs 111 protruding from an interior of the plug insulator 11. The second plug signal terminal is provided with a second plug weld leg, and the second plug weld leg of the second plug signal terminal 13 penetrates through the first solder blocking portion 14 and the second plug weld leg extends outside the plug. In the embodiment, the connector is the ultra-small spacing connector, wherein an ultra-small spacing refers to a distance between adjacent second plug signal terminal and first plug signal terminal along a length direction of the plug in the connector, and the distance along the length direction of the plug is less than or equal to 0.15 mm. In the embodiment, the first plug signal terminal is provided with a first plug weld leg, and the first plug weld leg of the first plug signal terminal extends between two convex ribs. In the embodiment, the first plug weld legs and the second plug weld legs on each convex rib are arranged in a staggered mode, which means that the second plug weld leg of the second plug signal terminal 13 penetrates through the first solder blocking portion 14 and the second plug weld leg extends outside the plug, and the first plug weld leg of the first plug signal terminal extends between two convex ribs. Such arrangement increases a distance between the first plug weld leg and the second plug weld leg, and avoids solder ball connection between a solder ball on the first plug weld leg and a solder ball on the second plug weld leg during welding, resulting in a short circuit between the first plug signal terminal and the second plug signal terminal.

In the embodiment, the first solder blocking portion 14 is provided, and the second plug weld leg of the second plug signal terminal 13 penetrates through the first solder blocking portion 14 and extends outwardly. When the second plug signal terminal 13 is welded, the welding is performed at the weld leg of the second plug signal terminal 13. At the moment, the solder ball formed on a welded part is blocked by the first solder blocking portion 14, so as to stop overflowing upwardly to contact with an outside wall of the second plug signal terminal 13, resulting in poor contact. Then, a problem that the ultra-small spacing connector in the prior art is prone to poor contact is solved, with an effect of preventing the solder ball from rolling upwardly to contact with an outside of the terminal.

Preferably, each second plug signal terminal 13 corresponds to one first solder blocking portion 14.

In the embodiment, two sides of the convex rib 111 are both provided with a plurality of second plug signal terminals 13, and each second plug signal terminal 13 is arranged at an equal interval. A gap is formed between every two adjacent first solder blocking portions 14, which ensures that each terminal is protected by the first solder blocking portions 14. Meanwhile, when the first solder blocking portions 14 are heated, the gap formed between two first solder blocking portions 14 provides a certain expansion space for the first solder blocking portions 14, so that the ultra-small spacing connector is prevented from deforming excessively towards the socket 2, thus ensuring a safety of the whole ultra-small spacing connector.

Figure 9:
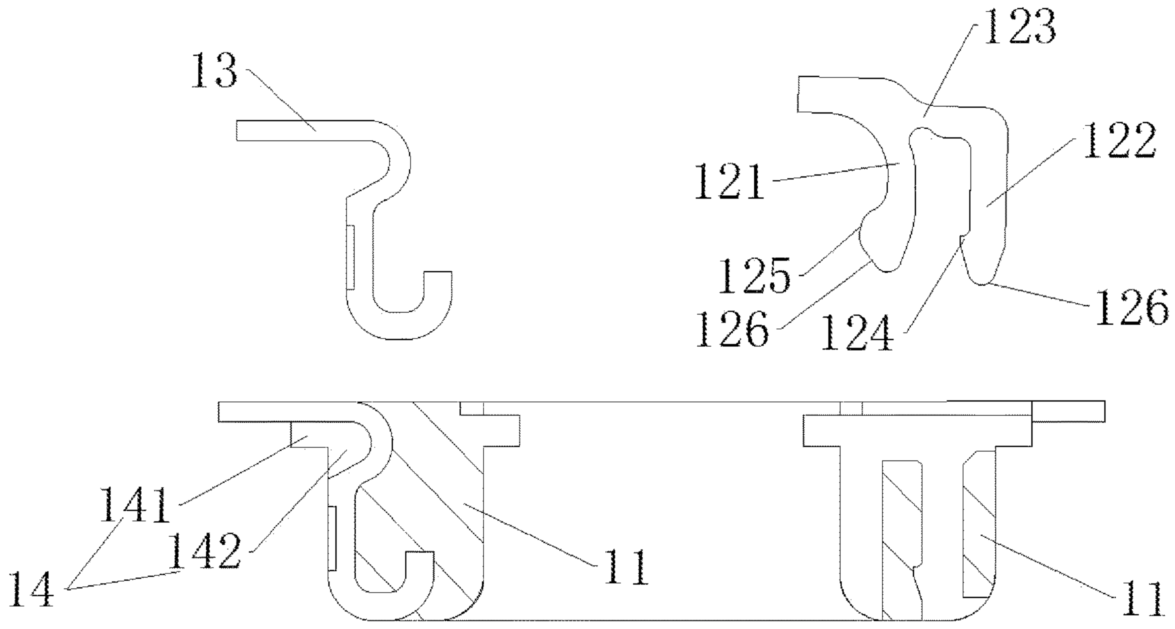
FIG. 9 is an exploded cross-sectional view of the plug in specific Embodiment 1 of the present invention.

Preferably, as further shown in FIG. 9, the first solder blocking portion 14 comprises a first portion 141 exposed on the convex rib 111 and a second portion 142 buried in the convex rib 111, and the second plug signal terminal 13 is wound on one side of the second portion 142 facing the first plug signal terminal 12.

In the embodiment, the second plug signal terminal 13 is wound on the second portion 142, which is equivalent to burying the second plug signal terminal 13 between the first solder blocking portion 14 and the convex rib 111 in one aspect, and the first solder blocking portion 14 restricts an outward movement of the second plug signal terminal 13, and plays a role of fixing the second plug signal terminal 13. In the other aspect, the second portion 142 of the first solder blocking portion 14 extends towards an interior of the convex rib 111, and when the first portion 141 is heated and melted, the second portion 142 continues to play a role of preventing the solder ball from rolling upwardly, which is equivalent to widening a length of the whole first solder blocking portion 14, thus playing a better role of blocking the solder ball.

Preferably, the second portion 142 is arranged in an arc protruding towards one side of the first plug signal terminal 12.

In the embodiment, the second plug signal terminal 13 is also correspondingly arranged in an arc shape, and the second plug signal terminal 13 is attached to the convex rib 111, so that a shape and a structure of the whole second plug signal terminal 13 are more stable and not easy to deform. The arc-shaped second portion 142 disperses an acting force generated by the whole second plug signal terminal 13, thus reducing a possibility of deformation of the second portion 142 under an effect of an external force.

Preferably, one face of the second plug signal terminal 13 facing away from the socket 2 exposes the first solder blocking portion 14, and is flush with one face of the first solder blocking portion 14 facing away from the socket 2.

In the embodiment, one face of the second plug signal terminal 13 facing away from the socket 2 exposes the first solder blocking portion 14, so that a weldable area of the whole second plug signal terminal 13 is increased, thus being convenient to weld the second plug signal terminal 13 later.

Preferably, the convex rib 111 is integrally molded with the first solder blocking portion 14.

In the embodiment, the convex rib 111 and the first solder blocking portion 14 are injection-molded through a mold, thus having a simple processing technology and improving a production efficiency.

Figure 10:
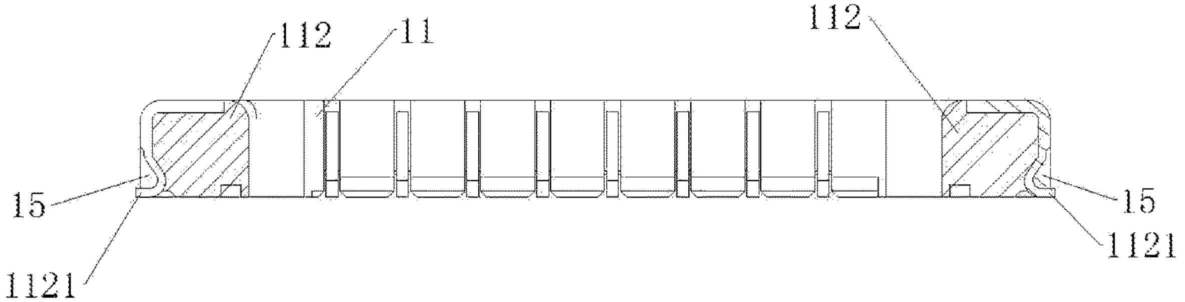
FIG. 10 is a cross-sectional view of the plug in specific Embodiment 1 of the present invention.
Figure 11:
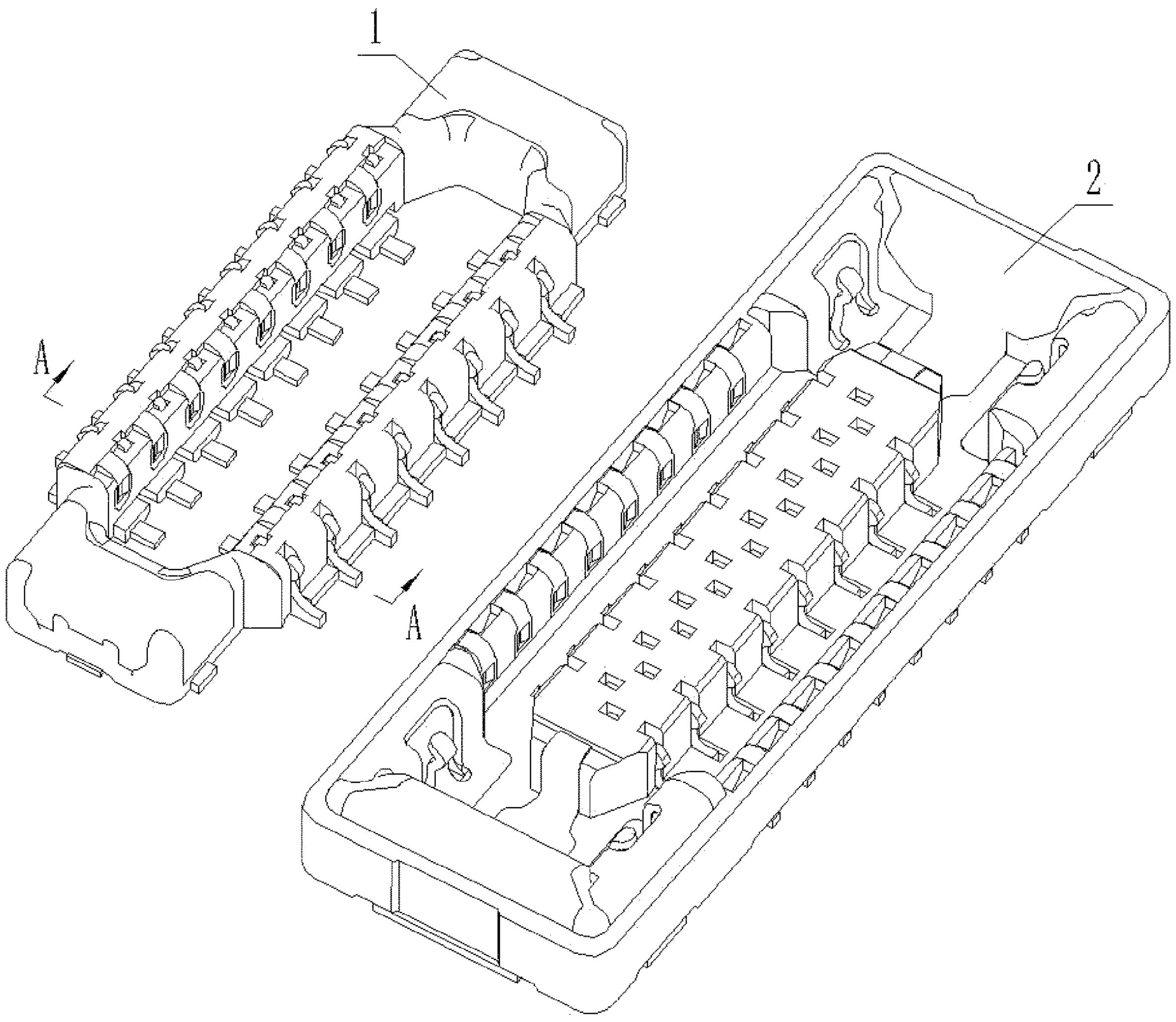
FIG. 11 is a schematic exploded diagram of the connector in specific Embodiment 3 of the present invention.
Figure 12:
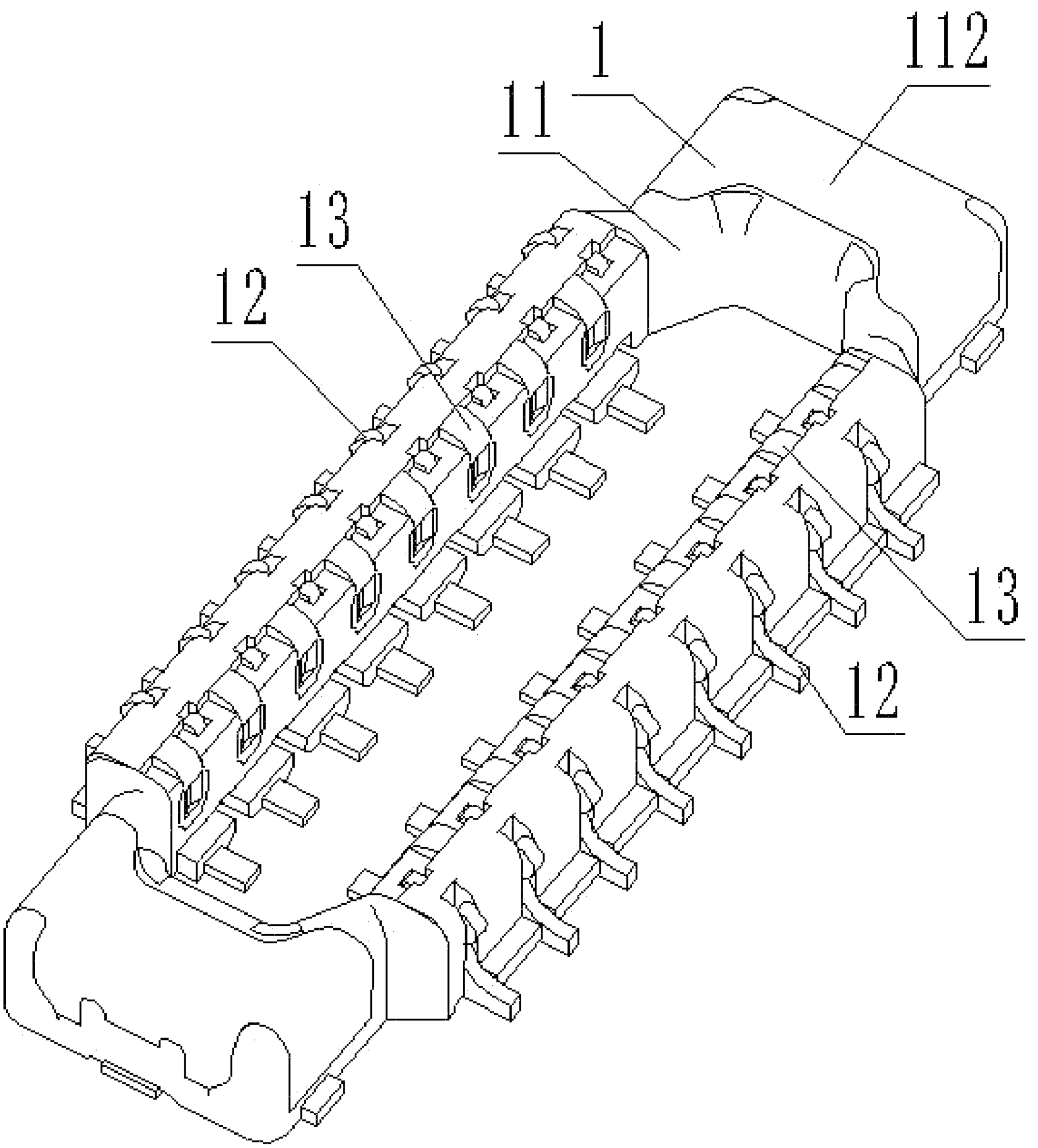
FIG. 12 is a schematic structural diagram of the plug in specific Embodiment 3 of the present invention.
Figure 13:
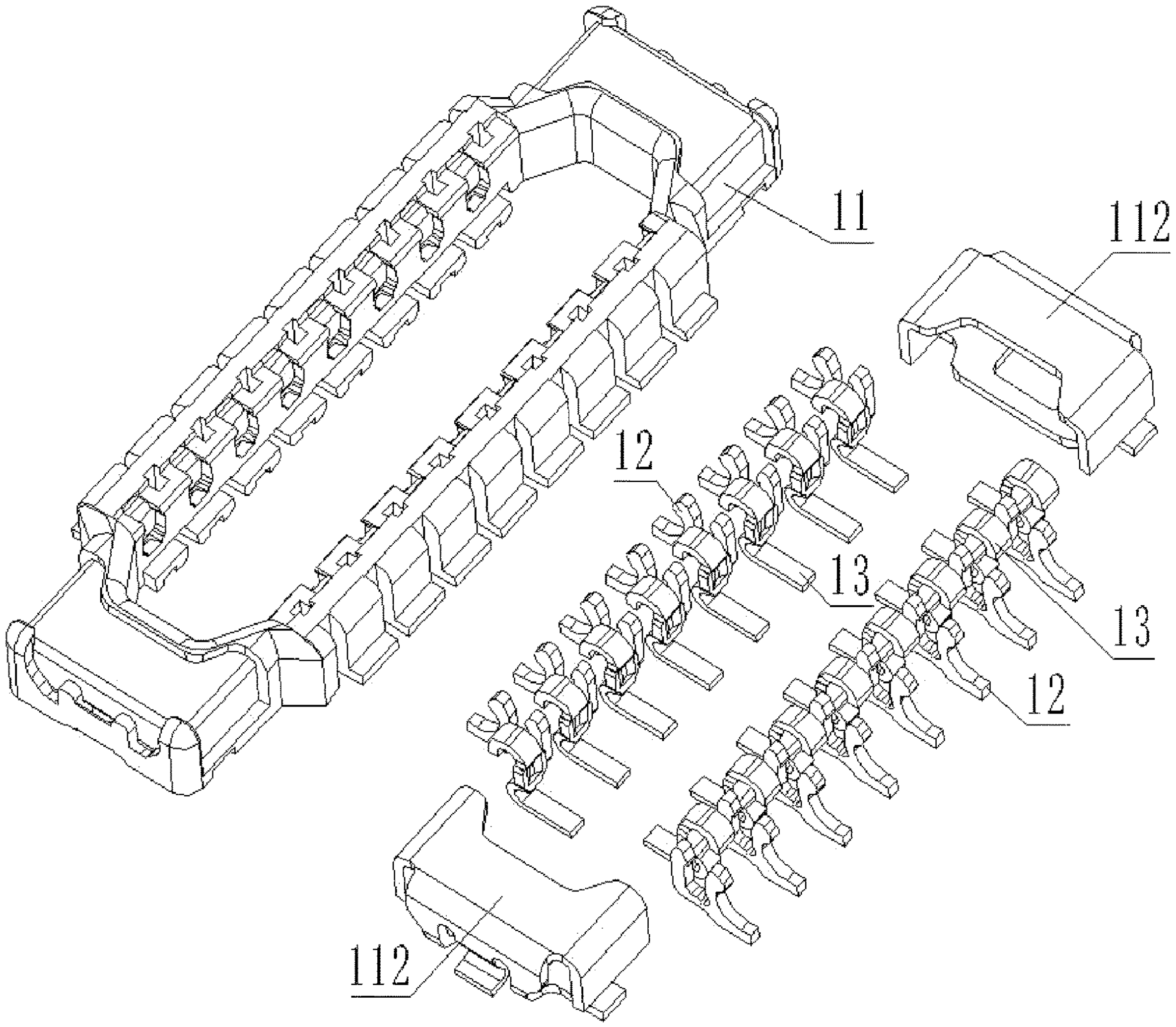
FIG. 13 is a schematic exploded structural diagram of the plug in specific Embodiment 3 of the present invention.
Figure 14:
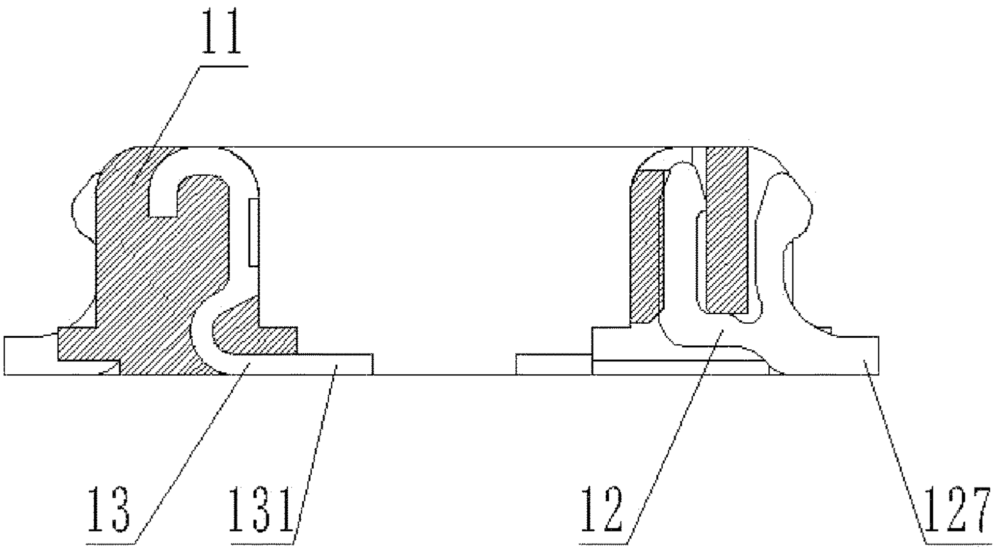
FIG. 14 is a cross-sectional view of an A-A part in FIG. 11.

As shown in FIG. 10, one side of a plug fixing member 112 facing away from the socket 2 is provided with a fifth plug weld leg 1121, and the fifth plug weld leg 1121 is located at an end portion of the whole plug 1. The plug fixing member 112 is provided with a second solder blocking portion 15 corresponding to the third weld leg 1121, the second solder blocking portion 15 is also provided with a cambered face facing an interior of the plug 1, and the second solder blocking portion 15 is set to prevent the solder ball from interfering with other components when welding the third weld leg 1121.

Specific Embodiment 2

The specific Embodiment 2 is an improvement based on the specific Embodiment 1. Specifically, with reference to FIG. 2 and FIG. 3, the first plug signal terminal 12 comprises a contact elastic arm 121. The first plug signal terminals 12 and the second plug signal terminals 13 on each convex rib 111 are arranged in a staggered mode. One side of each convex rib 111 facing away from the socket 2 is respectively provided with one clamping groove 113 corresponding to each first plug signal terminal 12, and the first plug signal terminals 12 are clamped into the clamping grooves 113.

In the embodiment, the second plug signal terminals 13 and the first plug signal terminals 12 are arranged in a staggered mode, so that more welding space is given to the first plug signal terminals 12 and the second plug signal terminals 13 when connected with other components, thus reducing a size of the whole ultra-small spacing connector. The plug insulator 11 is integrally injection-molded, and the two convex ribs 111 are arranged in parallel, with a same structure. The ultra-small spacing connector is a connector with a small distance between two sets of terminals, and in the embodiment, the distance between two sets of first plug signal terminals 12 may also be a distance between two convex ribs 111. Since the distance between two sets of first plug signal terminals 12 is small, it is not convenient to perform injection molding on the first plug signal terminals 12 and the plug insulator 11 during injection molding. Since the second plug signal terminals 13 are located outside, and the space is not limited, the second plug signal terminals 13 may be buried in injection-molded plastic when the plug insulator 11 is injection-molded, thus accelerating a mounting speed of the second plug signal terminals 13. In other embodiments, the convex ribs 111 may also be provided with inserting grooves corresponding to the second plug signal terminals 13, and the second plug signal terminals 13 are inserted into the inserting grooves. In addition, the second plug signal terminal 13 is molded by stamping and bending, and the first plug signal terminal 12 is integrally molded by stamping.

According to the present invention, the first plug signal terminals 12 are clamped into the clamping grooves 113 on the plug insulator 11 without needing secondary injection molding, only the plug insulator 11 needs to be injection-molded according to a model, and then the first plug signal terminals 12 are inserted into the clamping grooves 113.

Without needing the secondary injection molding, technical problems of tedious production process and low efficiency of the plug 1 in the ultra-small spacing connector in the prior art are solved. The present invention has the advantages of simple operation, accelerated production speed and improved production efficiency. Moreover, the present invention is convenient to open a mold for the plug insulator 11, thus reducing a production cost.

Preferably, with reference to FIG. 2, FIG. 4, FIG. 5 and FIG. 6, a clamping arm 114 is arranged in the clamping groove 113, and the clamping arm 114 is located in a middle portion of the clamping groove 113. The first plug signal terminal 12 is provided with a bayonet 128 corresponding to the clamping arm 114, and the first plug signal terminal 12 is inserted into the clamping groove 113 from the bayonet.

In the embodiment, the clamping arm 114 divides the clamping groove 113 into an inner groove and an outer groove, the outer groove is communicated with an inside of the plug insulator 11, an opening of the bayonet 128 faces the plug 1, the first plug signal terminal 12 is clamped into the clamping groove 113 from the opening of the bayonet 128 towards the socket 2, and at the moment, the contact elastic arm 121 is located in the outer groove, and may be electrically connected with terminals of the socket 2. The first plug signal terminal 12 is formed with the bayonet, and after the bayonet 128 of the first plug signal terminal 12 is inserted into the clamping groove 113, the clamping arm 114 abuts against an inner wall of the bayonet 128 to form a position, thus avoiding the first plug signal terminal 12 from being inserted over the position. End faces of all clamping arms 114 are in a same horizontal plane, so that all first plug signal terminals 12 are in a same plane after being clamped into the clamping grooves 113, thus having a tidy structure.

Preferably, each first plug signal terminal 12 further comprises: an arm body 122 and a connecting arm 123. One end of the arm body 122 is connected with the contact elastic arm 121 through the connecting arm 123. The bayonet 128 is formed between one end of the arm body 122 far away from the connecting arm 123 and the contact elastic arm 121.

In the embodiment, the contact elastic arm 121 is used for being contacted with the terminals of the socket 2 to form electrical connection. One face of the connecting arm 123 facing the bayonet 128 becomes a part clamped with the clamping arm 114, which limits a movement path of the first plug signal terminal 12, thus having an ingenious structure and a simple operation.

Figure 4:
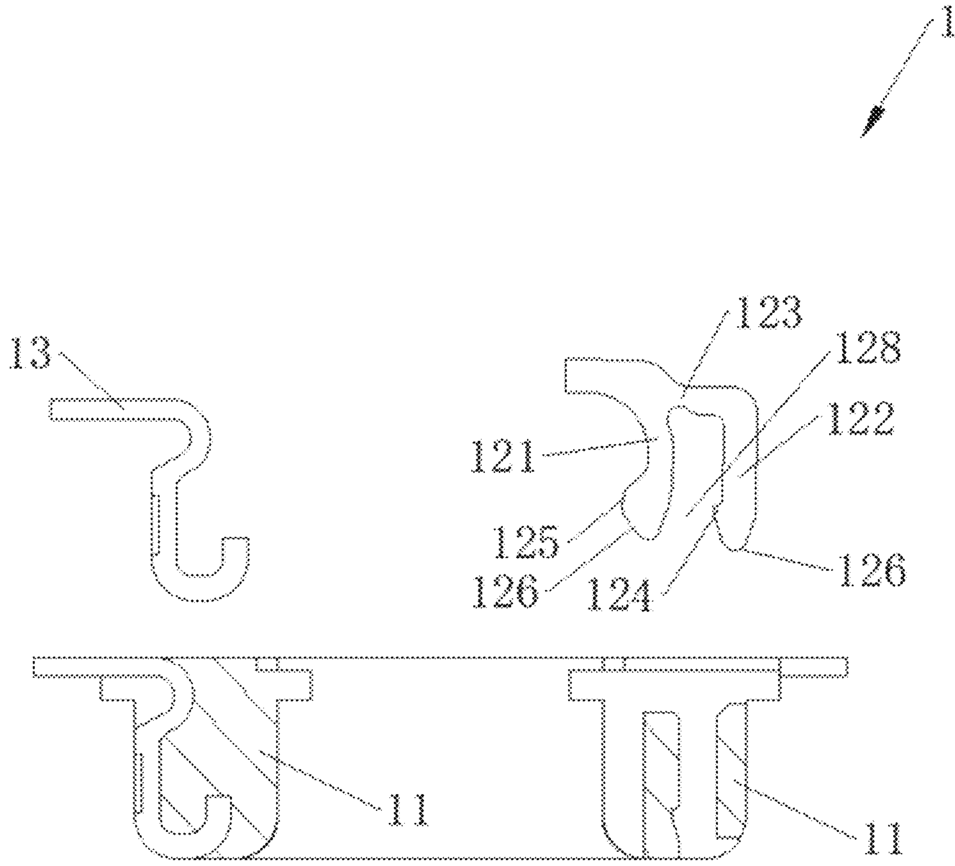
FIG. 4 is an exploded cross-sectional view of the plug in specific Embodiment 1 of the present invention.
Figure 5:
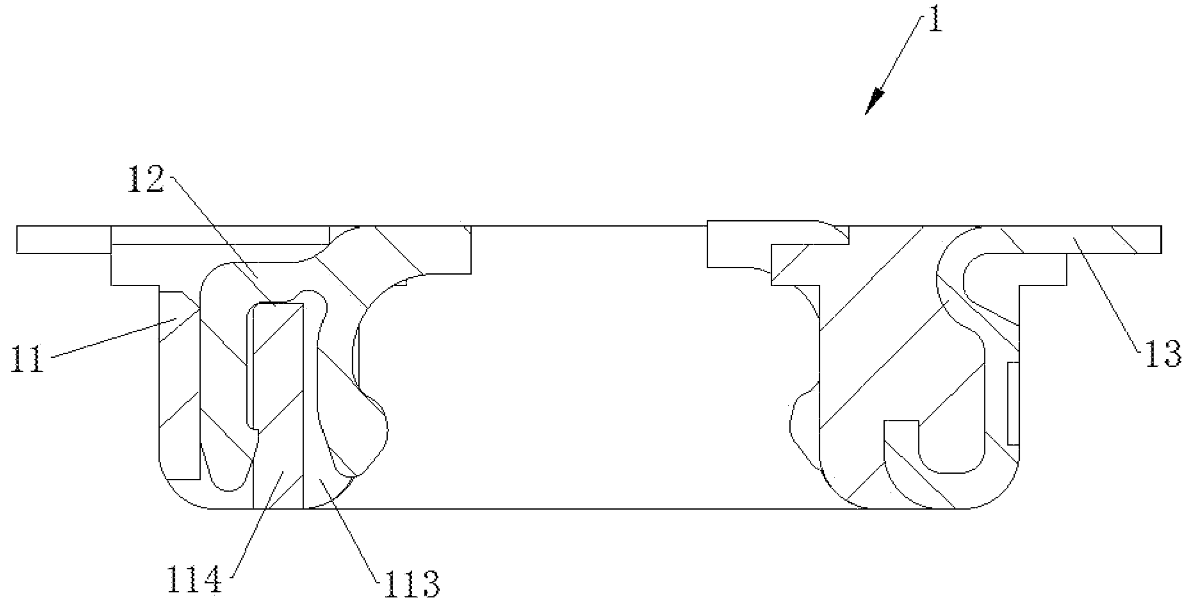
FIG. 5 is a cross-sectional view of the plug in specific Embodiment 1 of the present invention.
Figure 6:
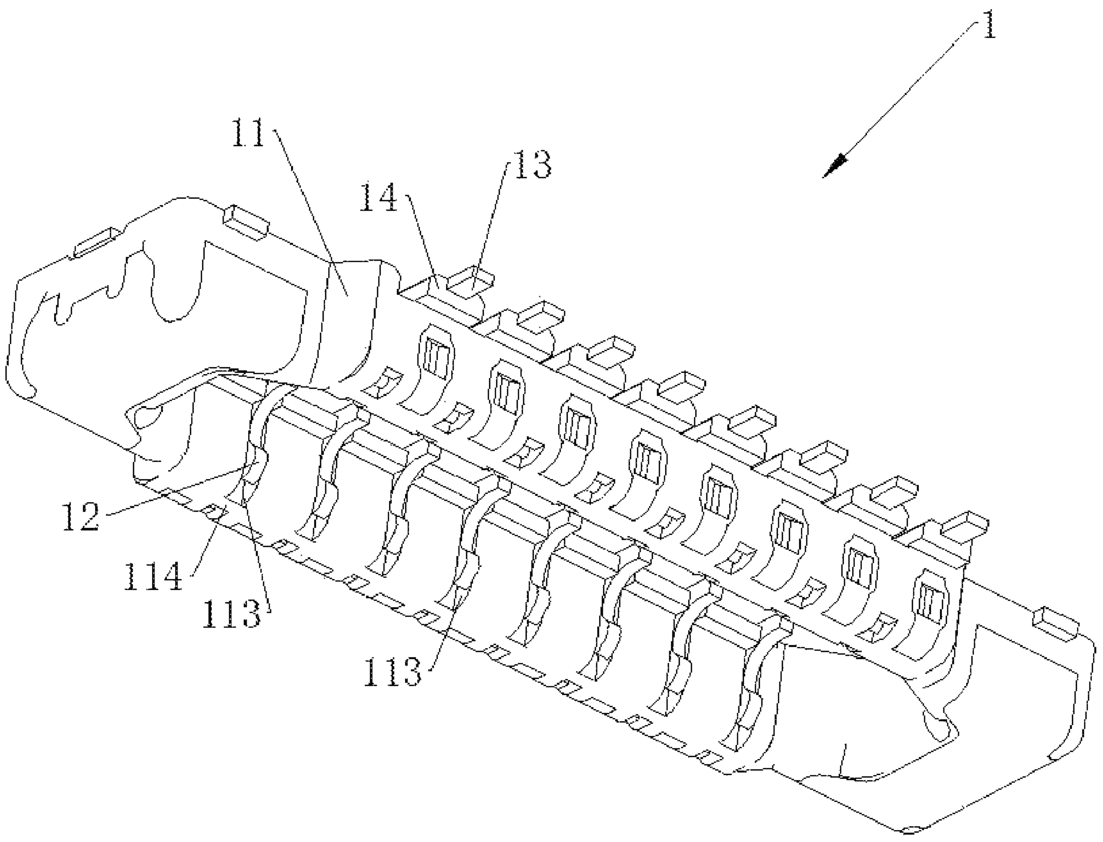
FIG. 6 is a schematic structural diagram of the plug in specific Embodiment 1 of the present invention.

Preferably, with reference to FIG. 4 and FIG. 5, the arm body 122 is provided with a protrusion 124, one side of the clamping arm 114 facing the arm body 122 is provided with a clamping portion, and the first plug signal terminal 12 is embedded into the clamping groove 113 until the protrusion 124 is clamped into the clamping portion.

In the embodiment, the protrusion 124 protrudes towards the contact elastic arm 121, the clamping portion is arranged in a groove shape, and after the protrusion 124 is clamped into the clamping portion, a movement of the whole first plug signal terminal 12 towards the socket 2 or far away from the socket 2 is restricted, and a movement of the first plug signal terminal 12 along a length direction of the convex rib 111 is also restricted. When the first plug signal terminal 12 is inserted into the clamping groove 113, the first plug signal terminal 12 is attached to a side wall of the clamping groove 113. Finally, the whole first plug signal terminal 12 is stabilized in the clamping groove 113.

Preferably, the contact elastic arm 121 is elastic, and the contact elastic arm 121 is arranged in an arc shape protruding towards the arm body 122.

In the embodiment, the contact elastic arm 121 has an elastic force capable of deforming towards or far away from the arm body 122. When the contact elastic arm 121 receives a force exerted towards an interior of a socket insulator 21, the contact elastic arm 121 may be bent far away from the arm body 122. Since the protrusion 124 occupies a certain space, the inner groove needs a larger width to be inserted into the arm body 122. Therefore, when the first terminal is inserted into the clamping groove 113, the contact elastic arm 121 is squeezed by the clamping arm 114 and deformed, so that the contact elastic arm 121 is bent far away from the arm body 122. At the moment, a gap between the contact elastic arm 121 and the arm body 122 is increased, which is convenient to insert into the clamping groove 113. When the protrusion 124 is inserted into the clamping portion, the whole first plug signal terminal 12 moves towards the interior of the plug insulator 11. At the moment, the connecting arm 123 no longer abuts against the contact elastic arm 121, and the contact elastic arm 121 returns to an original state. Therefore, the contact elastic arm 121 is arranged in an arc-shaped structure protruding towards the arm body 122, which is convenient to clamp the first plug signal terminal 12 into the clamping groove 113.

In addition, with reference to FIG. 4, an end portion of the contact elastic arm 121 is provided with a contact portion 125, and the contact portion 125 protrudes towards the plug insulator 11. When the contact elastic arm 121 receives a force exerted towards the arm body 122, the contact elastic arm 121 deforms towards the arm body 122, so that when the whole plug 1 is inserted into the socket 2, the contact elastic arm 121 deforms towards the arm body 122. When the contact portion 125 on the contact elastic arm 121 is clamped into the socket 2, a first socket signal terminal 22 is correspondingly provided with a concave portion, and the concave portion and the contact portion 125 are engaged with each other, so that the contact elastic arm 121 is reset and clamped. The present invention has a simple structure and an ingenious design, and not only solves a problem that the first plug signal terminals 12 are inserted into the clamping grooves 113, but also solves a problem of matched insertion between the plug 1 and the socket 2.

Preferably, a deformation space is formed at a joint of the connecting arm 123 and the contact elastic arm 121, and the deformation space is communicated with the bayonet.

In the embodiment, the connecting arm 123 is provided with a concave notch in a chamfer shape, which provides the deformation space for the contact elastic arm 121, and prevents the contact elastic arm 121 from being broken in the case of stressing and deformation, thus strengthening the first plug signal terminal 12, improving a structural stability of the first plug signal terminal 12, and further ensuring a quality of the whole ultra-small spacing connector.

Preferably, one ends of the contact elastic arm 121 and the arm body 122 facing the clamping groove 113 are both provided with a guide portion.

In the embodiment, the guide portion is set as a triangular shape, wherein two sides of the guide portion are set as a lead-in arc shape, which is convenient to insert the contact elastic arm 121 and the arm body 122 into the clamping groove 113.

Preferably, the first plug signal terminals 12 on two convex ribs 111 are arranged in a staggered mode.

In the embodiment, two opposite first plug signal terminals 12 on the convex ribs 111 do not interfere with each other in space, so that a structural size of the whole plug 1 is smaller, and a distance between the first terminals of the ultra-small spacing connector is further minimized.

Figure 2:
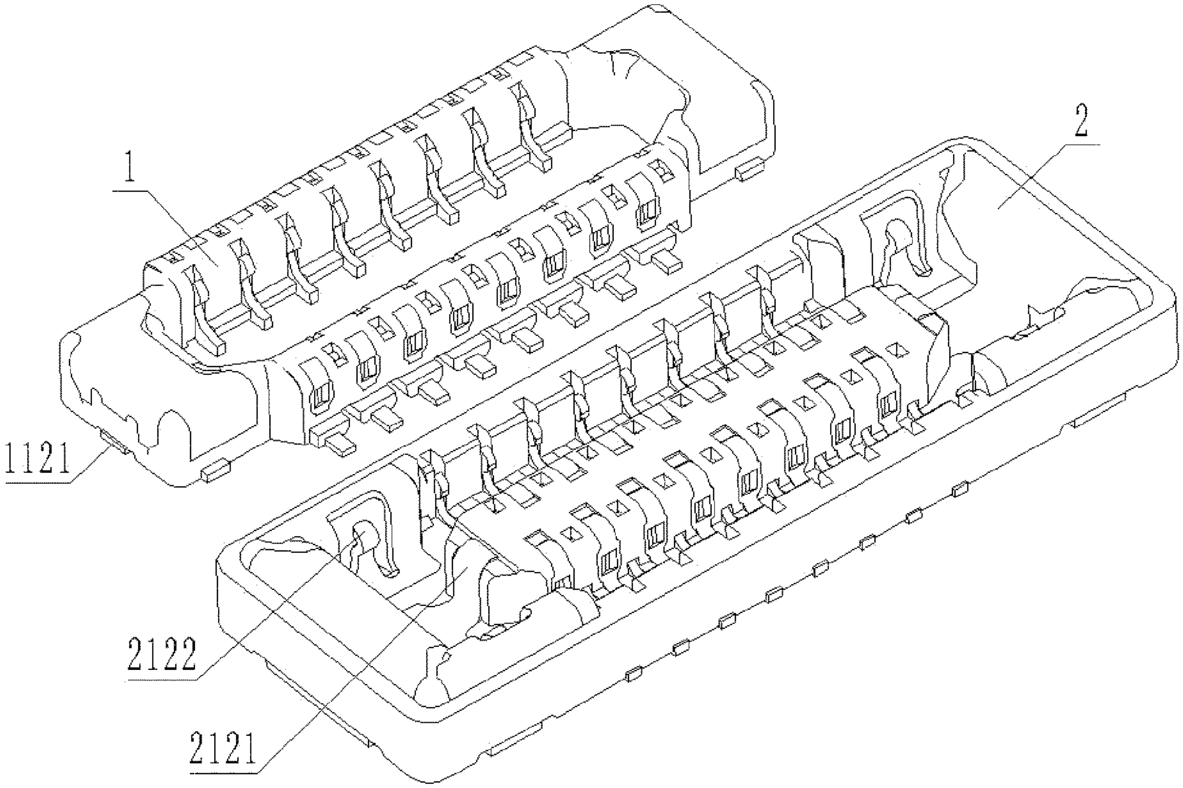
FIG. 2 is a schematic structural diagram of a plug in FIG. 1 rotated by 180°.

Preferably, with reference to FIG. 2 and FIG. 5, the plug insulator 11 further comprises two plug fixing members 112, the plug fixing members 112 are in a concave shape, and the two plug fixing members 112 are respectively connected with two ends of two convex ribs 111.

In the embodiment, two sides of the plug fixing member 112 are respectively connected with one convex rib 111, so that the whole plug insulator 11 is in a frame shape. One side of the plug fixing member 112 facing away from the socket 2 is provided with a fifth plug weld leg 1121, and the fifth plug weld leg 1121 is located at an end portion of the whole plug 1. One side of the plug fixing member 112 far away from the socket 2 is provided with a third plug weld leg 1122 and a fourth plug weld leg 1123, which are used for welding with other electrical appliances. One side of the plug fixing member 112 facing the socket 2 is provided with the guide portion 126, and the guide portion 126 is wrapped outside the plug fixing member 112, and plays a role of guiding the plug 1 to be inserted into the socket 2.

Figure 3:
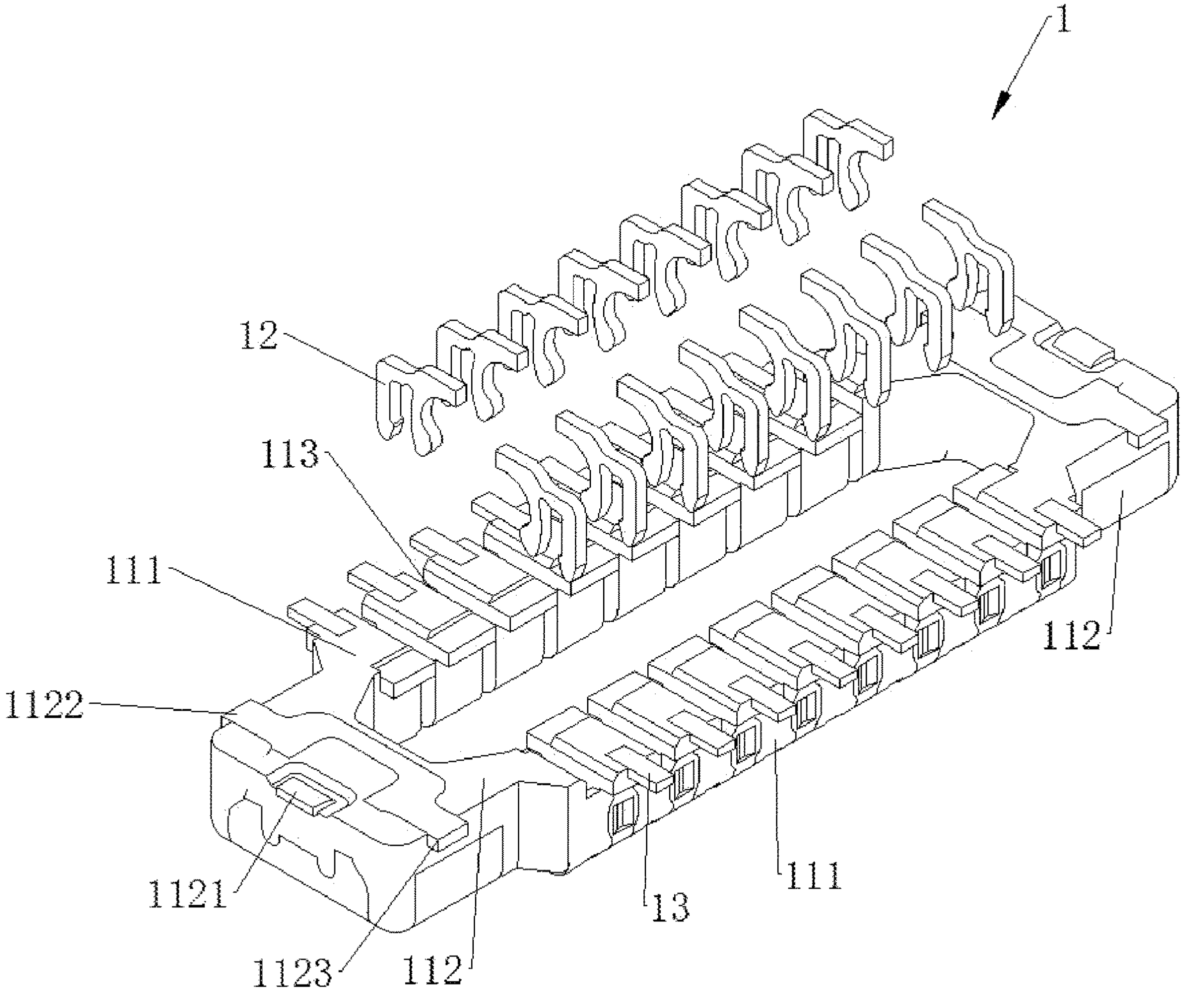
FIG. 3 is a schematic exploded diagram of the plug in specific Embodiment 1 of the present invention.
Figure 7:
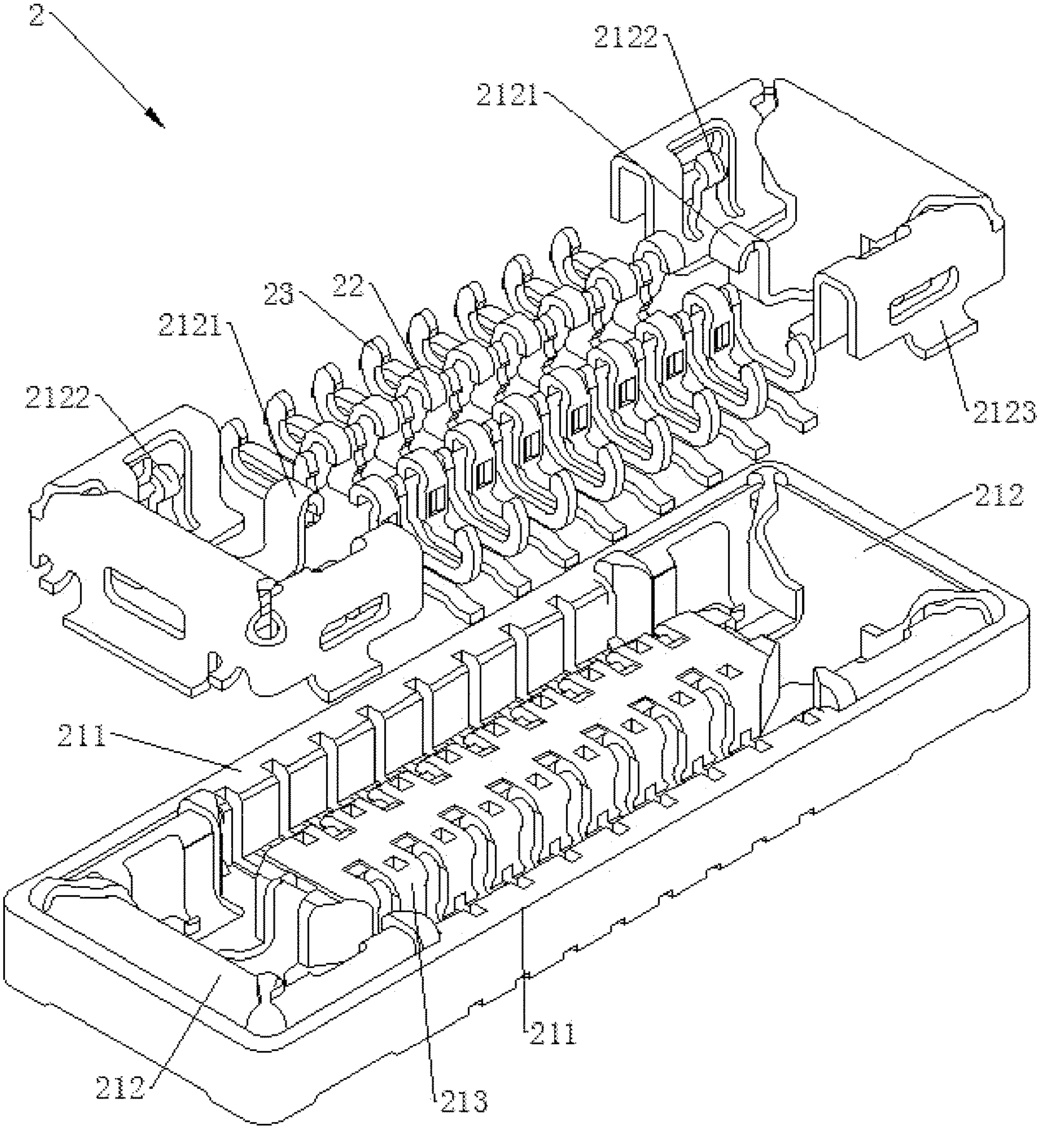
FIG. 7 a schematic exploded diagram of a socket in specific Embodiment 1 of the present invention.
Figure 8:
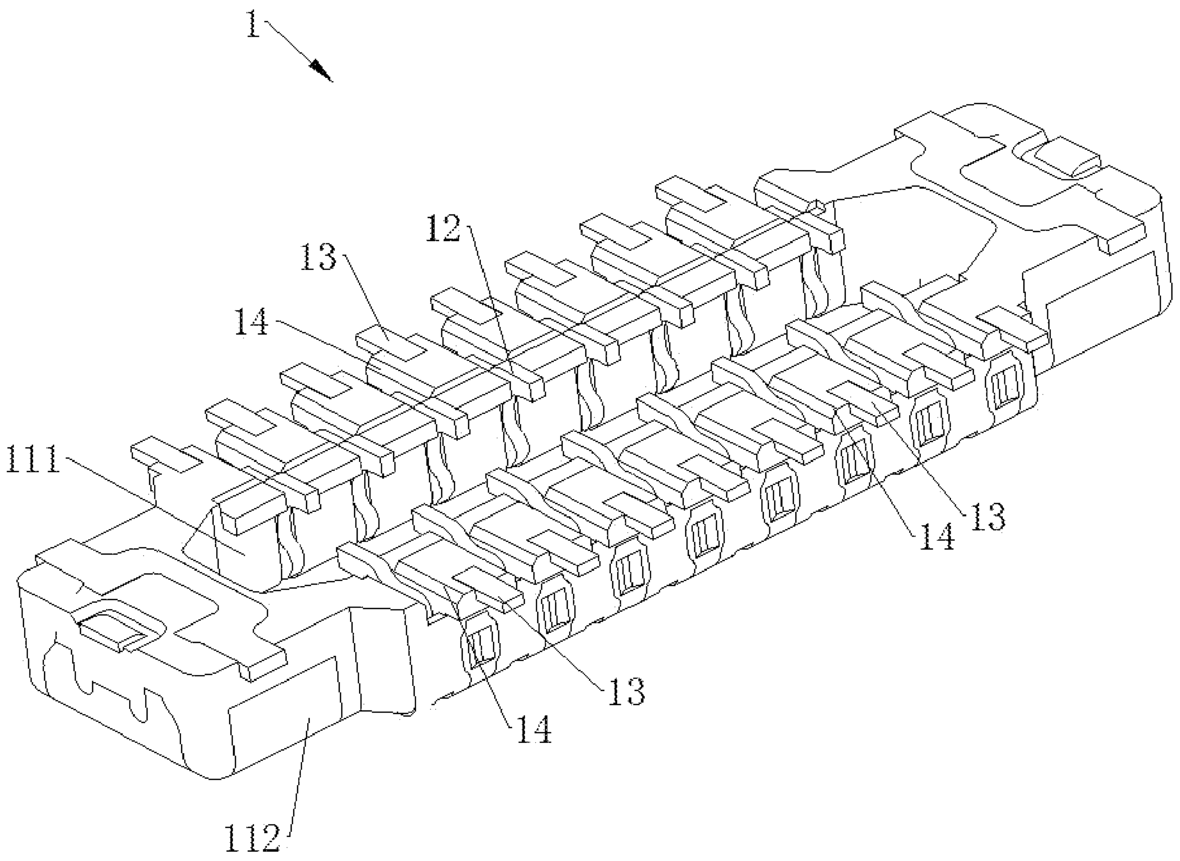
FIG. 8 is a schematic structural diagram of the plug in specific Embodiment 1 of the present invention.
Figure 15:
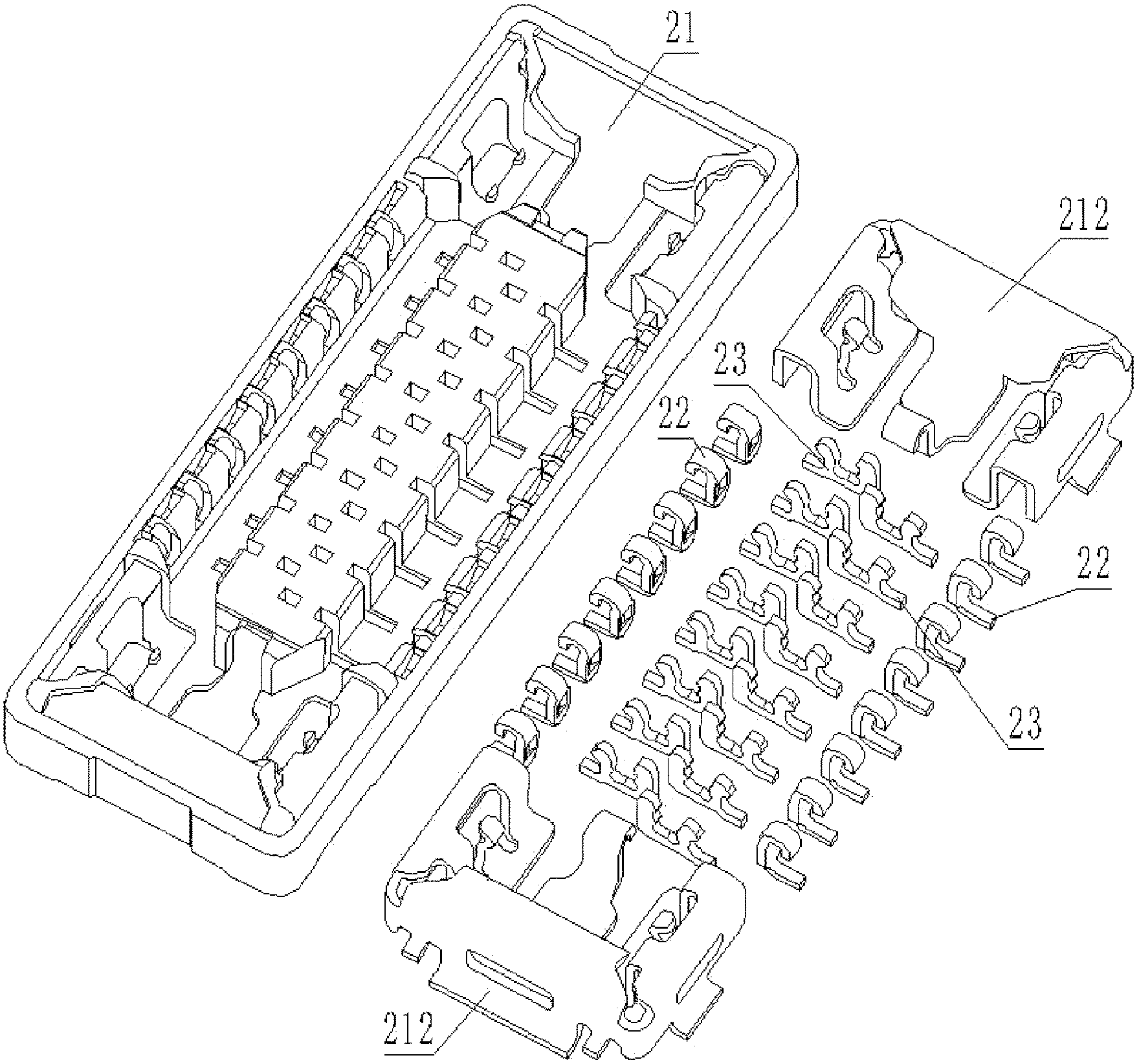
FIG. 15 is a schematic exploded structural diagram of the socket in specific Embodiment 3 of the present invention.
Figure 16:
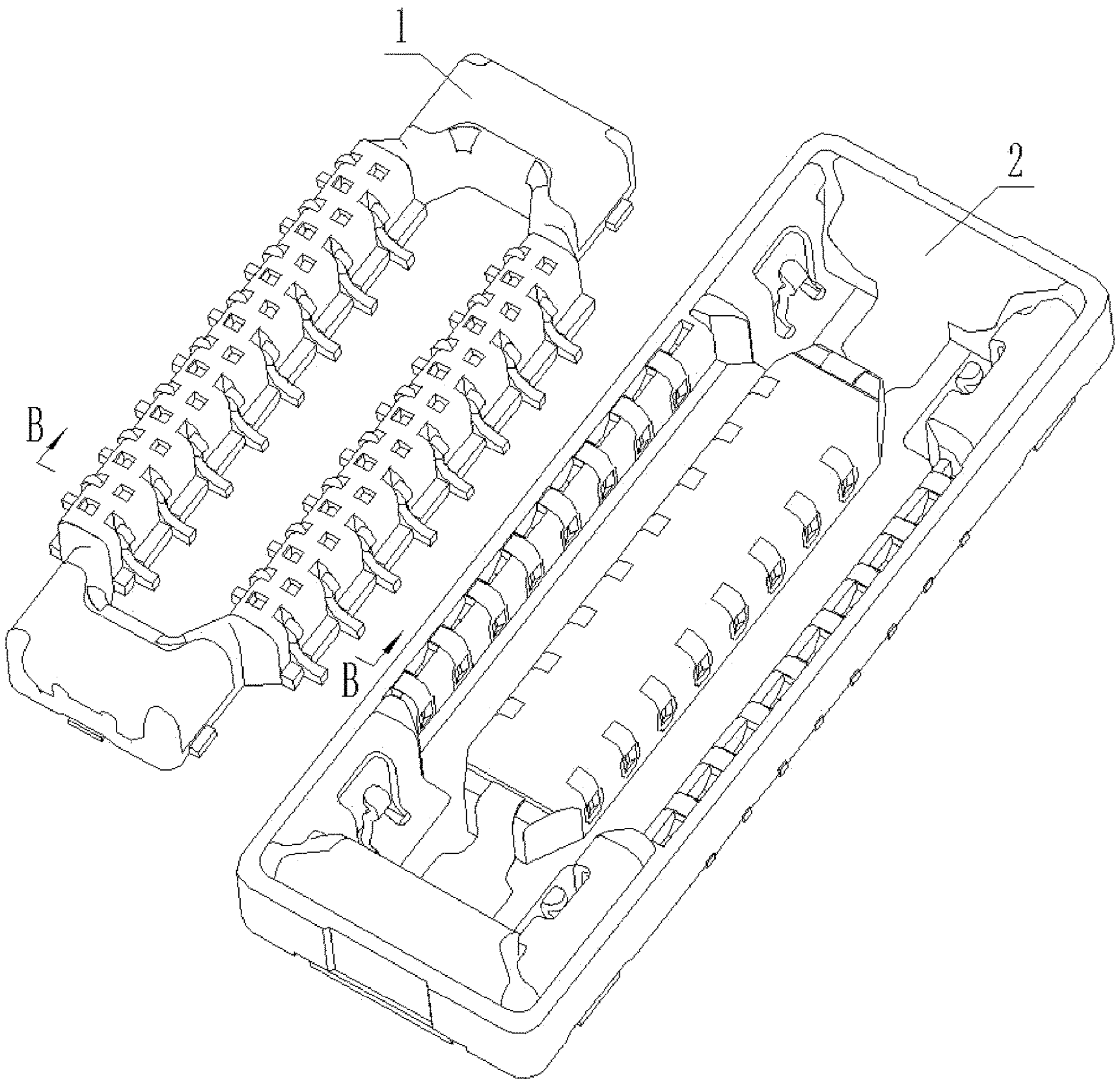
FIG. 16 is a schematic exploded diagram of the connector in specific Embodiment 4 of the present invention.
Figure 17:
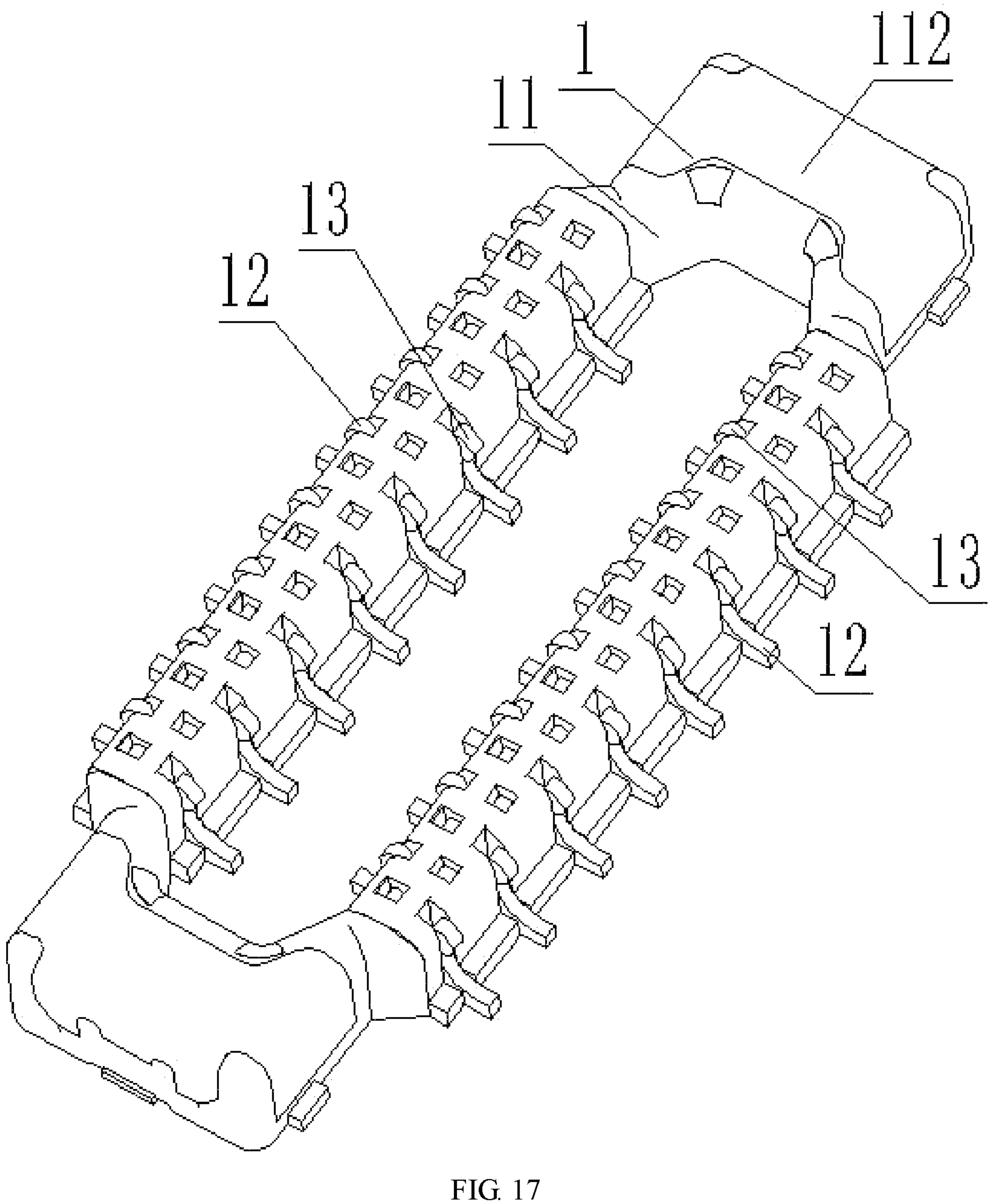
FIG. 17 is a schematic structural diagram of the plug in specific Embodiment 4 of the present invention.
Figure 18:
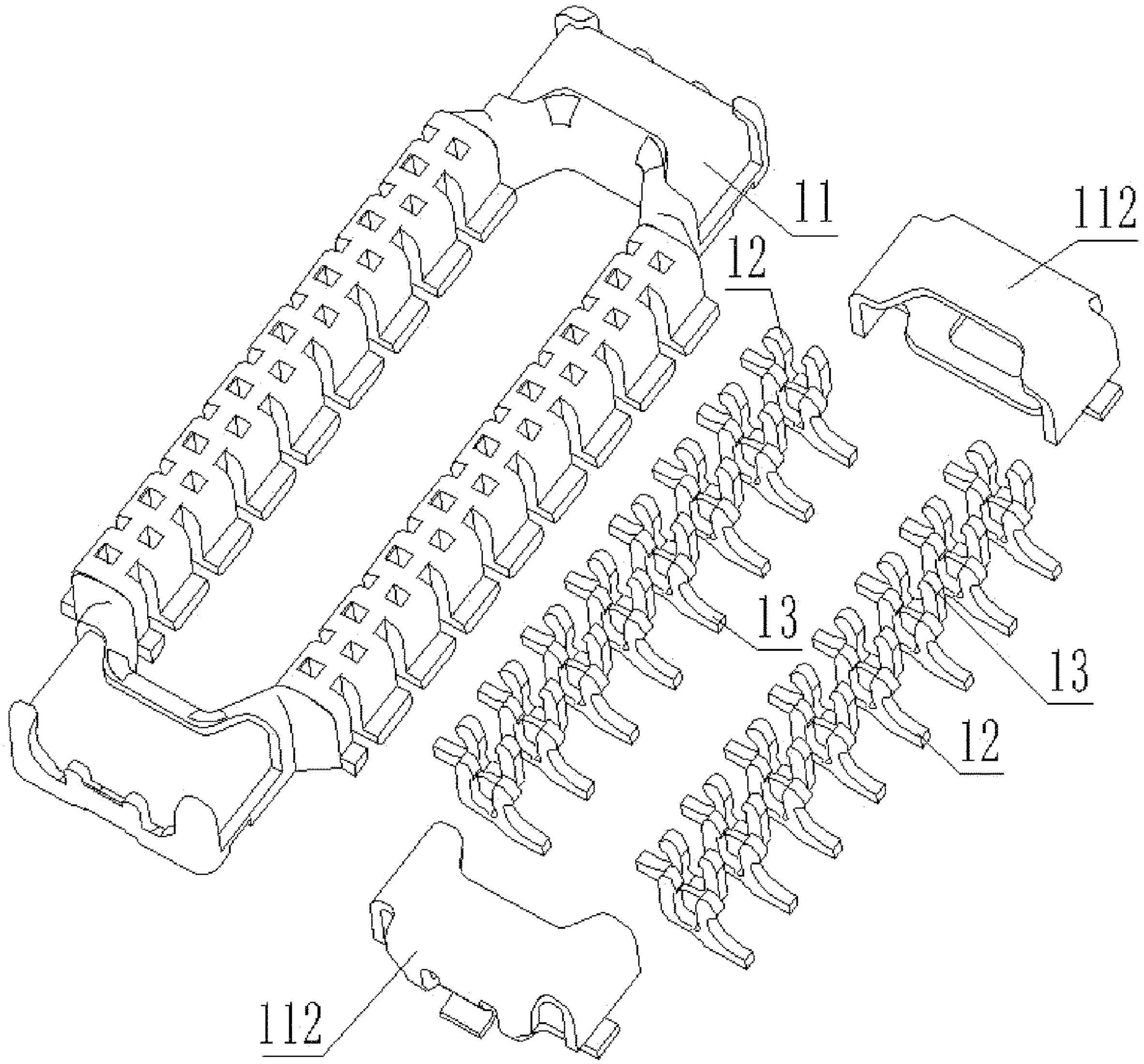
FIG. 18 is a schematic exploded structural diagram of the plug in specific Embodiment 4 of the present invention.
Figure 19:
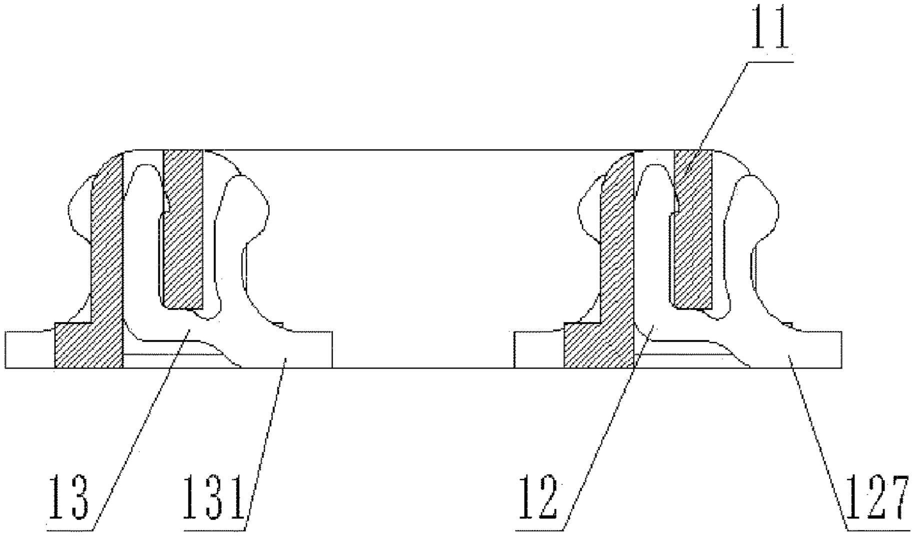
FIG. 19 is a cross-sectional view of a B-B part in FIG. 16.

With reference to FIG. 2 and FIG. 3, a structure of the socket 2 is complementary to that of the plug 1, and the convex ribs 111 in the plug 1 are inserted into the socket 2 to connect with the socket 2. With reference to FIG. 7 and FIG. 15, the socket 2 comprises a socket insulator 21, second socket signal terminals 23 and first socket signal terminals 22. The socket insulator 21 comprises two socket convex ribs 211, two socket fixing members 212 and a middle convex rib of the socket 2. The socket fixing members 212 are in a concave shape, and the two socket fixing members 212 are respectively connected with two ends of the two socket convex ribs 211. Two sides of the middle convex rib of the socket 2 respectively form a space with the two socket convex ribs 211 for the convex ribs 111 to be inserted. The first socket signal terminals 22 are arranged on two sides of the middle convex rib of the socket 2, and the first socket signal terminals 22 on two sides of the middle convex rib of the socket 2 are arranged in a staggered mode. The second socket signal terminals 23 are arranged on each side of the socket convex ribs 211 facing each other, and the second socket signal terminals 23 are elastic.

In order to be convenient to insert the plug 1 into the socket 2, two sides of the convex rib 111 are both provided with a lead-in arc, and an upper end face of the convex rib 111 is set as a plane, which is convenient to attach the convex rib 111 to the socket 2. The lead-in arcs extend from two sides of the plane to two sides of the convex rib 111.

The socket convex ribs 211 are correspondingly provided with grooves of the second socket signal terminals 23, and the second socket signal terminals 23 and the first socket signal terminals 22 form the socket 2 by injection molding in a mold. The first socket signal terminal 22 and the second socket signal terminal 23 are both molded by bending and stamping. The second socket signal terminals 23 are elastic, and one faces of the second socket signal terminals 23 facing each other are provided with engaging portions. The engaging portions protrude towards the middle convex rib of the socket 2, and concave notches are correspondingly molded by stamping outside the second plug signal terminals 13. When the plug 1 is inserted into the socket 2, the middle convex rib of the socket 2 squeezes the first plug signal terminals 12, so that the first plug signal terminals 12 are deformed. Meanwhile, the second socket signal terminals 23 are squeezed by the convex ribs 111, so that the second socket signal terminals 23 are deformed. When the plug 1 moves to a certain position, the concave notches of the second plug signal terminals 13 are engaged with the engaging portions of the second socket signal terminals 23, and the first plug signal terminals 12 are engaged with the first socket signal terminals 22, thus fixing the plug 1 with the socket 2.

The socket fixing member 212 is correspondingly provided with a fixing portion 2121, and the fixing portion 2121 is matched with the guide portion 126. Two opposite sides of the fixing portion 2121 are provided with elastic members 2122, and the two elastic members 2122 are matched with each other to fix the guide portion 126, thus fixing the whole socket 2 with the whole plug 1. One side of the fixing portion 2121 of the socket 2 facing away from the plug 1 is provided with a first socket weld leg 2123 and a second socket weld leg, which are used for fixing with other power consuming parts.

Specific Embodiment 3

As shown in FIG. 11 to FIG. 15, specific Embodiment 3 is an improvement based on specific Embodiment 1 or specific Embodiment 2 above, which is different from specific Embodiment 1 or specific Embodiment 2 above that, the second plug weld leg 131 of the second plug signal terminal 13 in the embodiment extends between two convex ribs, and meanwhile, the first plug weld leg 127 of the first plug signal terminal 12 in the embodiment extends outside the plug.

Specific Embodiment 4

As shown in FIG. 16 to FIG. 20, specific Embodiment 4 is an improvement based on specific Embodiment 1 or specific Embodiment 2 above, which is different from specific Embodiment 1 or specific Embodiment 2 above that, a structure of the second plug signal terminal 13 in the embodiment is the same as that of the first plug signal terminal 12, and a structure of the second socket signal terminal 23 is the same as that of the first socket signal terminal 22. The second plug weld leg 131 of the second plug signal terminal 13 extends between two convex ribs, and the first plug weld leg 127 of the first plug signal terminal 12 extends outside the plug. A connecting structure between the second plug signal terminal 13 and the second socket signal terminal 23 is the same as that between the first plug signal terminal 12 and the first socket signal terminal 22.

Specific Embodiment 5

Embodiment 5 of the present invention provides an electronic device, and the electronic device comprises the ultra-small spacing connector according to any one of the items above.

Specific Embodiment 6

Figures 20, 21:
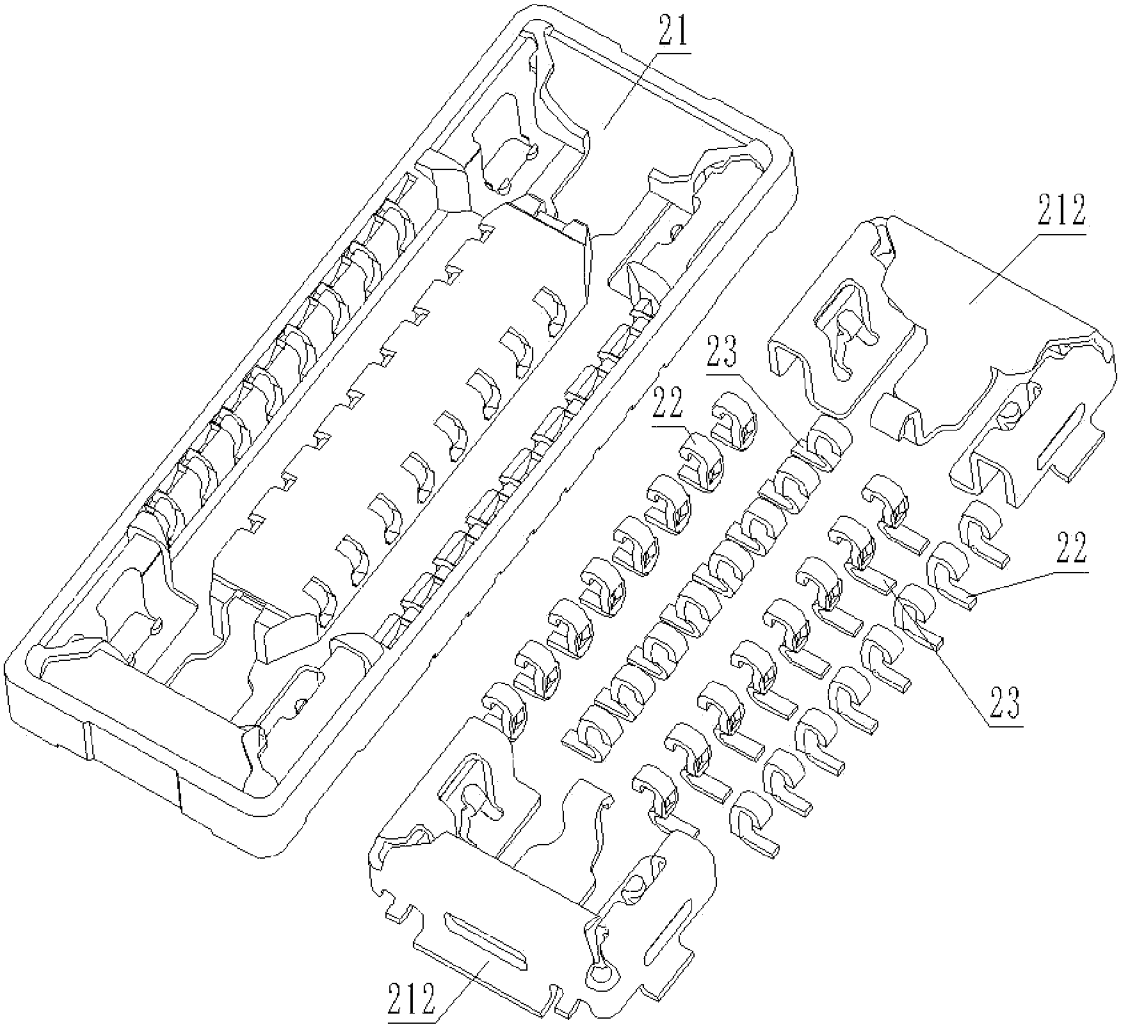
FIG. 20 is a schematic exploded structural diagram of the socket in specific Embodiment 4 of the present invention.
FIG. 21 is a process flow diagram of a manufacturing method of the plug in specific Embodiment 6 of the present invention.
Figure 22:
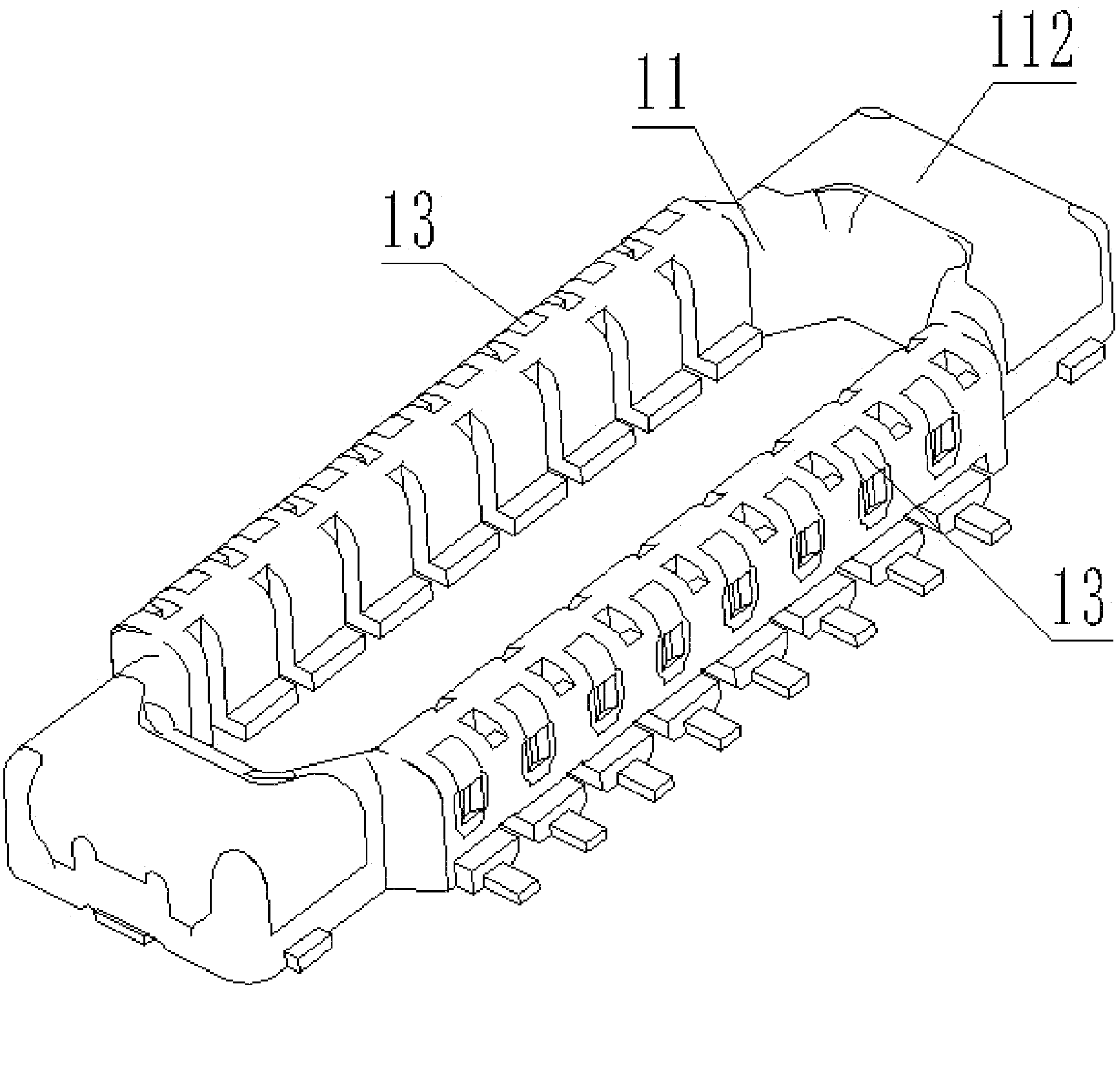
FIG. 22 is a schematic structural diagram of the plug in step S1 in specific Embodiment 6 of the present invention.
Figure 23:
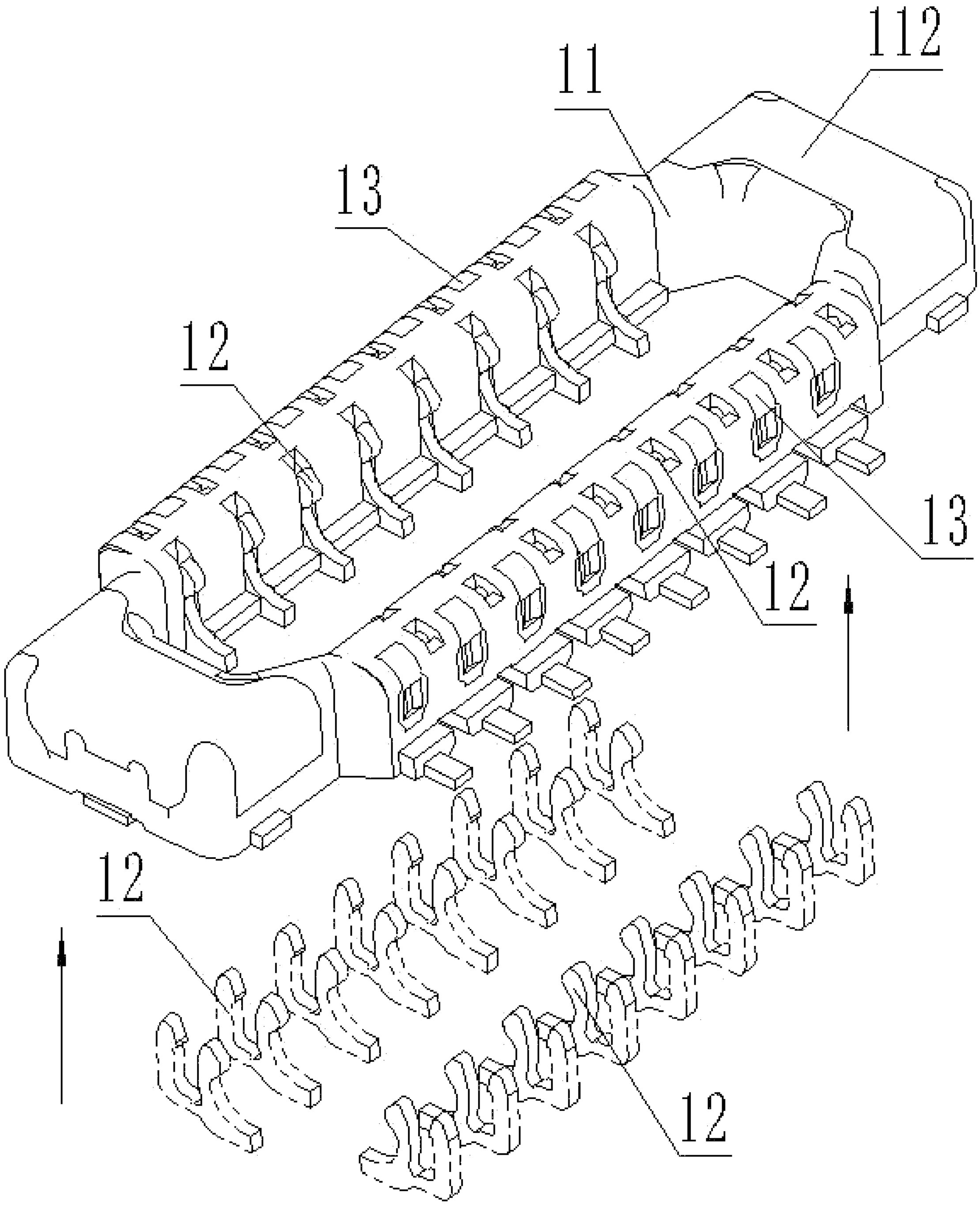
FIG. 23 is a schematic structural diagram of the plug in step S2 in specific Embodiment 6 of the present invention.

Embodiment 6 of the present invention provides a manufacturing method of a plug. The plug is the plug according to any of Embodiment 1 to Embodiment 3 above. As shown in FIG. 21, the manufacturing method of the plug comprises the following steps of: S1: performing injection molding on the second plug signal terminals and the plug fixing members to obtain the plug insulator connected with the second plug signal terminals and the plug fixing members respectively; and S2: accommodating the first plug signal terminals in the clamping grooves of the plug insulator to obtain the plug. At the moment, a shape of the plug is shown in FIG. 23, dotted lines in FIG. 23 indicate a state before the first plug signal terminals are accommodated in the plug insulator, and the first plug signal terminals are inserted into the clamping grooves from one side of the plug insulator facing away from the socket.

In the embodiment, the first plug signal terminals are clamped into the clamping grooves on the plug insulator without needing secondary pouring, only the plug insulator needs to be molded by pouring according to a model, and then the first plug signal terminals are inserted into the clamping grooves, so that the present invention is simple in operation, accelerates a production speed, and improves a production efficiency. Moreover, the present invention is convenient to open a mold for the plug insulator, thus reducing a production cost. The present invention solves technical problems of tedious production process and low efficiency of the ultra-small spacing plug in the prior art.

In the embodiment, before step S1, the manufacturing method of the plug above further comprises the following steps of: S1': taking materials from socket materials to obtain a first socket material member and a second socket material member in predetermined shapes, which may be finished by cutting in the embodiment, wherein the predetermined shape of the first socket material member is matched with the second plug signal terminal, the predetermined shape of the second socket material member is matched with the plug fixing member, and the socket materials may be different materials, such as copper, aluminum, silver and gold; S1'': bending the first socket material member into the second plug signal terminal; and S1''': bending the second socket material member into the plug fixing member.

In the embodiment, before step S1, the manufacturing method of the plug above further comprises the following step of: S1''''; taking materials from socket materials to obtain the first plug signal terminals.

INDUSTRIAL APPLICABILITY

The multi-channel signal transmission apparatus and the electronic device provided by the present invention are described in detail above, the specific examples are used herein to explain the principle and embodiments of the present invention, and the above embodiments are only described to help understanding the method and the core concept of the present invention. Meanwhile, for those of ordinary skills in the art, variations may be made on the specific embodiments and the application scope according to the concept of the present invention. To sum up, The contents of the specification are only the embodiments of the present invention, and are not intended to limit the patent scope of the present invention. Any equivalent structure or equivalent process transformations made by using the contents of the specification of the present invention, or directly or indirectly used in other related technical fields, are equally included in the patent protection scope of the present invention, and should not be understood as limiting the present invention.

What is claimed is:

1. An ultra-small spacing plug comprising:

a plug insulator, the plug insulator is frame-shaped, and the plug insulator comprises two convex ribs arranged oppositely;

a plurality of first pug signal terminals, the first plug signal terminals are arranged on each side of the two convex ribs facing each other; and a plurality of second signal terminals, the second plug signal terminals are arranged on each side of the two convex ribs far away from each other;

wherein the first signal terminals and the second plug signal terminals on each plug convex rib are arranged in a staggered mode; and one side of each convex rib is respectively provided with a clamping groove corresponding to each first signal terminal, and the first signal terminals are clamped in the clamping grooves; and wherein an ultra-small spacing refers to a distance between adjacent second signal terminal and first signal terminal along a length direction of the plug in the connector, and the distance along the length direction of the plug is equal to 0.15 mm;

wherein a clamping arm is arranged in the clamping groove, and the clamping arm is located in a middle portion of the clamping groove; and the first signal terminal is provided with a bayonet corresponding to the clamping arm, and the first signal terminal is inserted into the clamping groove from the bayonet; and wherein each first signal terminal further comprises: an arm body, a contact elastic arm and a connecting arm; one end of the arm body is connected with the contact elastic arm through the connecting arm; and the bayonet is formed between one end of the arm body far away from the connecting arm and the contact elastic arm.

2. The ultra-small spacing plug according to claim 1, wherein the arm body is provided with a protrusion, each side of the clamping arm facing the arm body is provided with a clamping portion, and the first signal terminal is embedded into the clamping groove until the protrusion is clamped into the clamping portion.

3. The ultra-small spacing plug according to claim 2, wherein the contact elastic arm is elastic, and the contact elastic arm is arranged in an arc shape protruding towards the arm body.

4. The ultra-small spacing plug according to claim 3, wherein a deformation space is formed at a joint of the connecting arm and the contact elastic arm, and the deformation space is communicated with the bayonet.

5. The ultra-small spacing plug according to claim 1, wherein the first signal terminal is provided with a first plug weld leg, the second signal terminal is provided with a second plug weld leg, and the first plug weld legs and the second plug weld legs on each convex rib are arranged in a staggered mode.

6. A connector comprising the ultra-small spacing plug according to claim 1.

7. An electronic device comprising the ultra-small spacing plug according to claim 1.

* * * * *